United States Patent [19]
Takano et al.

[11] Patent Number: 6,105,375
[45] Date of Patent: Aug. 22, 2000

[54] REFRIGERATING CYCLE APPARATUS WITH CONDENSER-SIDE REFRIGERANT RECOVERY MODE

[75] Inventors: Yoshiaki Takano, Kosai; Satoshi Izawa, Kariya, both of Japan

[73] Assignee: Denso Corporation, Kariya, Japan

[21] Appl. No.: 09/447,111

[22] Filed: Nov. 22, 1999

[30] Foreign Application Priority Data

Nov. 25, 1998 [JP] Japan ................................. 10-334389
Aug. 2, 1999 [JP] Japan ................................. 11-218862

[51] Int. Cl.$^7$ ........................................ F25B 45/00
[52] U.S. Cl. ................................ 62/149; 62/196.4; 165/62
[58] Field of Search ............................ 62/149, 159, 196.4

[56] References Cited

U.S. PATENT DOCUMENTS

| | | | |
|---|---|---|---|
| 4,698,981 | 10/1987 | Kaneko et al. | 62/180 |
| 5,065,584 | 11/1991 | Byczynski et al. | 62/196.4 X |
| 5,291,941 | 3/1994 | Enomoto et al. | |
| 5,651,258 | 7/1997 | Harris | 62/196.4 |

FOREIGN PATENT DOCUMENTS 5-272817  10/1993  Japan .

*Primary Examiner*—William Doerrler
*Assistant Examiner*—ChenWen Jiang
*Attorney, Agent, or Firm*—Harness, Dickey & Pierce, PLC

[57] ABSTRACT

A refrigerating cycle apparatus having a hot gas bypass heating mode that quickly recovers refrigerant in the condenser side to the evaporator side to maximize the work performed by the compressor in the hot gas bypass heating mode, to thereby maximize hot gas bypass heating capacity. Specifically, in a refrigerating cycle apparatus in which operation of a hot gas bypass heating mode is carried out with the inlet side of a condenser closed and the inlet side of a hot gas bypass conduit opened by valves, refrigerant in the condenser side is recovered to the evaporator side by operating the compressor for a predetermined time with the inlet sides of both the condenser and the hot gas bypass conduit closed by the valves.

21 Claims, 9 Drawing Sheets

REFRIGERATING CYCLE APPARATUS WITH CONDENSER-SIDE REFRIGERANT RECOVERY MODE

CROSS-REFERENCE TO RELATED APPLICATIONS

The present application is related to, and claims priority from, Japanese Patent Application Nos. Hei. 10-334389 and 11-218862, the contents of which are incorporated herein by reference.

BACKGROUND OF THE INVENTION

1. Field of the Invention

The present invention relates generally to vehicle air conditioning systems, and particularly to a refrigerating cycle apparatus in which an evaporator is used as a radiator in a hot gas cycle by directly receiving heated gas refrigerant from a compressor, and wherein refrigerant (including oil) in the condenser side is recovered for use in the hot gas cycle upon the occurrence of predetermined conditions.

2. Related Art

In a vehicle air-conditioning system, when winter heating is required, warm engine cooling water is circulated through a heat exchanger for heating, and air is heated by the warm water. However, when the temperature of the warm water is low, the temperature of the air blown into the passenger compartment is low, and it may not be possible to adequately heat the compartment.

Japanese Patent Application Laid-Open No. Hei. 5-272817 describes a refrigerating cycle apparatus having a heating function executed via a hot gas bypass. Air can be heated by introducing gas refrigerant from the compressor directly into the evaporator, bypassing the condenser, and releasing heat to the air in the evaporator during engine start-up when the water temperature is less than a predetermined value.

Also, the high-side pressure on the delivery side of the compressor is detected, and any excess or shortage of circulating refrigerant in the hot gas bypass heating mode is detected. When there is an excess of refrigerant, some refrigerant is discharged to the condenser side. When there is a shortage of refrigerant, some refrigerant is recovered from the condenser side. Specifically, the recovery of refrigerant from the condenser side is carried out by operating the compressor with the inlet side of the condenser open and the inlet side of the hot gas bypass conduit closed (normal cooling mode).

However, in the hot gas bypass heating mode, because the high-side pressure on the compressor delivery side fluctuates due to various factors such as the cycle heating load, the compressor speed and the throttle diameter of an expansion valve in the hot gas bypass conduit, accurately identifying an excess or a shortage of refrigerant based on high-side pressure alone is difficult.

In addition to this, at the start of hot gas bypass it takes a long time for the high-side pressure to stabilize. This time typically takes at least 5 minutes. During this period, there is a shortage of heating capacity due to a refrigerant shortage, as well as an insufficient amount of oil being returned to the compressor, and consequent inadequate lubrication of the compressor.

Also, when recovery of refrigerant from the condenser is carried out during winter heating, because the outside air temperature is low and consequently the cooling heat load is extremely small, the high-low pressure difference of the refrigerating cycle is also very small. Consequently, when the compressor is a variable capacity compressor with its capacity varied via the high-low pressure difference, the capacity of the compressor remains small and does not increase, therefore often making it impossible to recover the condenser refrigerant.

SUMMARY OF THE INVENTION

It is therefore an object of the present invention to quickly recover refrigerant from the condenser side to the evaporator side at the start of the hot gas bypass heating mode. The present invention recovers this condenser-side refrigerant by forcibly recovering refrigerant resting in the condenser side into the hot gas cycle at the start of hot gas bypass operation.

More specifically, the present invention provides a refrigerating cycle apparatus having a valve for switching a connection between the delivery side of a compressor and the inlet side of a condenser and a connection between the delivery side of the compressor and the inlet side of a hot gas bypass conduit. Operation of a normal cooling mode is carried out with the inlet side of the condenser being opened and the inlet side of the hot gas bypass conduit being closed by the valve. Operation of a hot gas bypass heating mode is carried out with the inlet side of the condenser being closed and the inlet side of the hot gas bypass conduit being opened by the valve.

Also, a controller is provided for recovering refrigerant resting in the condenser side to the evaporator side when the hot gas bypass heating mode is started by operating the compressor with at least the inlet side of the hot gas bypass conduit closed by the valve.

In this case, because refrigerant recovery control is carried out at the start of the hot gas bypass operation, and in conjunction therewith, refrigerant recovery control can be carried out simply and surely at the start of hot gas bypass operation compared to conventional systems.

Furthermore, because it is not necessary to wait until the cycle high-side pressure stabilizes after resting refrigerant recovery control starts, as in conventional systems, a prolonged state of insufficient heating capacity caused by a shortage of refrigerant can be prevented. Consequently it is possible for the heating capacity to be raised swiftly after cycle start-up, and the return of oil to the compressor can also be performed in a short time after cycle start-up. Therefore, the life of the compressor can be increased.

The reference numerals assigned in parentheses to the means discussed above indicate correspondence with specific means set forth in the following description of currently preferred embodiments of the invention.

DETAILED DESCRIPTION OF THE PREFERRED EMBODIMENTS

Preferred embodiments of the invention will now be described with reference to the accompanying drawings.

(First Preferred Embodiment)

Figure 1:
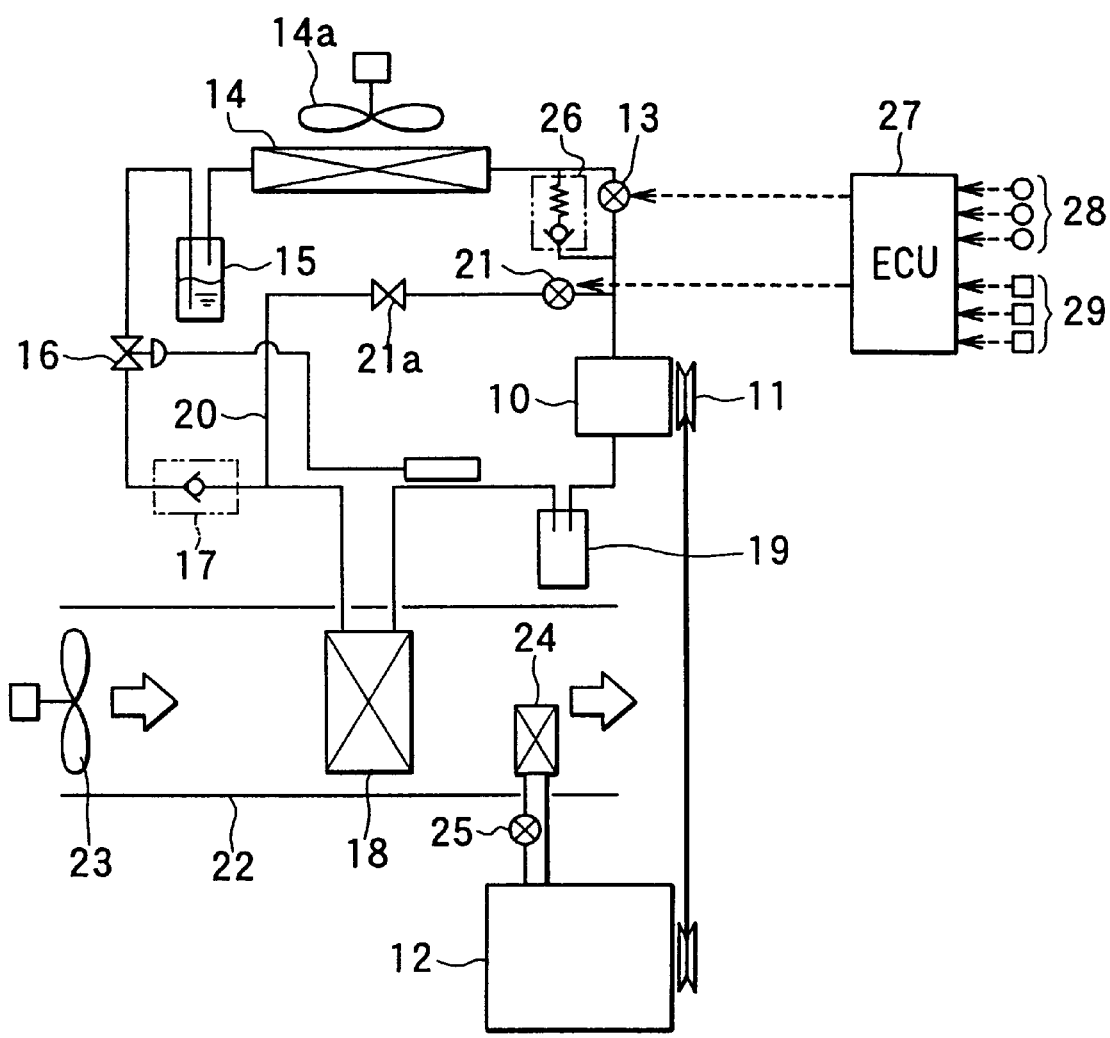
FIG. 1 is a schematic view of a refrigerating cycle of a first preferred embodiment of the present invention.

FIG. 1 shows a first preferred embodiment, wherein the invention is applied to a refrigerating cycle apparatus in a vehicle air-conditioning system. A water-cooled vehicle engine 12 by way of an electromagnetic clutch 11 drives a compressor 10. The delivery side of the compressor 10 is connected by way of a first electromagnetic valve 13 to a condenser 14, and the outlet side of this condenser 14 is connected to a receiver 15 for separating gas and liquid components of refrigerant and collecting liquid refrigerant. Outside ambient air used for cooling is blown through the condenser 14 by an electric cooling fan 14a.

The outlet side of the receiver 15 is connected to a temperature-controlled expansion valve 16. The outlet side of the expansion valve 16 is connected by way of a check valve 17 to an evaporator 18. The outlet side of the evaporator 18 is connected by way of an accumulator 19 to the intake side of the compressor 10. During normal refrigerating cycle operation (i.e. in a cooling mode) the temperature-controlled expansion valve 16 has its aperture adjusted in a known fashion so that the degree of superheating of refrigerant at the outlet of the evaporator 18 is kept at a predetermined value. The accumulator 19 separates gas and liquid refrigerant components and collects liquid refrigerant and feeds gas refrigerant and a small amount of liquid refrigerant from near the bottom thereof (in which oil is dissolved) to the compressor 10.

A hot gas bypass conduit 20 bypassing the condenser 14 is provided between the delivery side of the compressor 10 and the inlet side of the evaporator 18, and a second electromagnetic valve 21 and a pressure-reducing throttle 21a are provided in series with the hot gas bypass conduit 20. The throttle 21a may consist of a fixed throttle such as an orifice or a capillary tube and so on.

The evaporator 18 is disposed inside an air-conditioner case 22 of the vehicle air-conditioning system. When the system is in the cooling mode (including cooling for dehumidification), the evaporator 18 cools air from inside the passenger compartment of the vehicle or outside air blown through it by an electric air-conditioning blower 23. When the system is in a winter heating mode, the evaporator 18 takes in high-temperature refrigerant gas (hot gas) from the hot gas bypass conduit 20 and heats the air blown through it, thus performing the role of a radiator.

Inside the air-conditioner case 22, a warm water type heat exchanger 24 for heating air blown through it with warm water from the vehicle engine 12 as a heat source is disposed on the downstream side of the evaporator 18. Air is blown into the passenger compartment through outlets (not shown) provided on the downstream side of the heat exchanger 24. A warm water valve 25 for controlling the flow of warm water through the heat exchanger 24 is provided in a warm water circuit in the heat exchanger 24.

Also, on the delivery side of the compressor 10, a pressure relief valve 26, which opens when the pressure of delivered refrigerant gas rises abnormally to above a predetermined value (for example 25 kg/cm2G), is disposed in parallel with the first electromagnetic valve 13. As this pressure relief valve 26, a known valve configuration combining a spring and a valve biased by the spring is preferably used.

An air-conditioning electronic control device (ECU) 27 made up of a microcomputer and peripheral circuits thereof processes input signals in accordance with a preset program to control opening and closing of the first and second electromagnetic valves 13, 21 and the operation of the other electric devices (11, 14a, 23, 25 and so on). Signals from a set of sensors 28 including a vehicle engine water temperature sensor, an outside air temperature sensor, and an evaporator exit air temperature sensor, and from a set of control switches 29 on an air-conditioning control panel, are input into the ECU 27. These control switches 29 include a cooling switch for setting a cooling mode and a heating switch for setting a hot gas bypass heating mode.

Next, the operation of the first preferred embodiment will be described. In the cooling mode, the ECU 27 opens the first electromagnetic valve 13 and closes the second electromagnetic valve 21. Consequently, when the electromagnetic clutch 11 is engaged and the compressor 10 is driven by the vehicle engine 12, delivered gas refrigerant flows through the open first electromagnetic valve 13 into the condenser 14. In the condenser 14, the refrigerant is cooled and condensed by outside air supplied by the cooling fan 14a. Condensed liquid refrigerant is separated from gas refrigerant in the receiver 15, and this liquid refrigerant alone is reduced in pressure by the temperature-controlled expansion valve 16 and assumes a low-temperature, low-pressure gas/liquid two-phase state.

The low-pressure refrigerant then flows through the check valve 17 into the evaporator 18, and evaporates after absorbing heat from the air supplied by the air-conditioning blower 23. Air cooled by the evaporator 18 is blown into and cools the passenger compartment. Gas refrigerant evaporated in the evaporator 18 is taken in by the compressor 10 via the accumulator 19 and is again compressed.

In the winter heating mode, the ECU 27 closes the first electromagnetic valve 13 and opens the second electromagnetic valve 21 and thus opens the hot gas bypass conduit 20. Consequently, high-temperature delivered gas refrigerant from the compressor 10 passes through the second electromagnetic valve 21 and is reduced in pressure by the throttle 21a before flowing into the evaporator 18. At this time, the check valve 17 prevents gas refrigerant from the hot gas bypass conduit 20 from flowing toward the temperature-controlled expansion valve 16.

In the evaporator 18, the superheated gas refrigerant reduced in pressure by the throttle 21a releases heat into the air delivered by the air-conditioning blower 23 and heats the air. At this time, if the warm water temperature of the vehicle engine 12 is high enough, the air can be further heated by the heat exchanger 24 by warm water being passed through the warm water type heat exchanger for heating 24 by way of the warm water valve 25, and a warmer draft can be blown into the passenger compartment. Gas refrigerant having given up heat in the evaporator 18 is taken in to the compressor 10 via the accumulator 19 and is again compressed.

Since the amount of heat released by the gas refrigerant in the evaporator 18 in the winter heating mode corresponds with the amount of compression work done by the compressor 10, it is necessary to increase the amount of compression work done by the compressor 10 to increase the amount of heat released in the evaporator 18. To this end it is necessary to recover refrigerant resting in the condenser 14 side and thereby prevent a shortage of circulating refrigerant during hot gas bypass operation.

Refrigerant recovery control for hot gas bypass operation pertaining to this preferred embodiment will now be described with reference to FIG. 2. The control routine of FIG. 2 starts for example when an ignition switch (not shown) of the vehicle engine 12 has been turned on and a switch among the air-conditioning side control switches 29 (for example a switch operating the air-conditioning blower 23) is turned on. At step S100 control initialization such as flag IG=0 and timer I=0 is carried out. Then, at step S110, signals from the sensors 28 and from the control switches 29 on the air-conditioning control panel are read.

It is then determined at step S120 whether the heating (hot gas operation) switch is ON. When the switch is ON, it is determined at step S130 if the cooling switch (air-conditioning switch) is OFF. When the cooling switch is OFF, it is determined at step S140 whether the outside air temperature is below a predetermined value (for example 10° C.). When the outside air temperature is below this predetermined value, it is determined at step S150 whether the engine water temperature is below a predetermined value (for example 80° C.).

When the engine water temperature is below this predetermined value, at step S160 it is determined if flag IG=0. If this determination is being made for the first time subsequent to the ignition switch of the vehicle engine 12 being turned on, then flag IG=0 and at step S170 resting refrigerant recovery control is carried out.

That is, the electromagnetic clutch 11 is turned on and the compressor 10 thereby started, the condenser cooling fan 14a and the air-conditioning blower 23 are kept off, and the first and second electromagnetic valves 13 and 21 are both closed. Processing then proceeds to step S180 and it is determined whether the timer I indicates a timing less than a predetermined value (for example, 30 seconds) When it is less than the predetermined value, processing proceeds to step S190 and updates the timer I to I+1 (sec).

Thus, until the timer I exceeds the predetermined time (for example 30 seconds) in the determination of step S180, the resting refrigerant recovery control of step S170 is continued. In this recovery control mode, since as a result of the first and second electromagnetic valves 13 and 21 being closed the circuit on the delivery side of the compressor 10 is blocked, refrigerant resting in the condenser 14 side is sucked out by a pressure drop caused by the sucking action of the compressor 10 and recovered to the evaporator 18 side. By obtaining the time in advance required for this refrigerant recovery and setting this time as the predetermined time of step S180, it is possible to continue the above recovery control mode and to complete the recovery of refrigerant to the evaporator 18 side.

During the refrigerant recovery control of step S170, when the high-side pressure increases abnormally to above the set value of the relief valve 26, the relief valve 26 opens and prevents the high-side pressure from further increasing. At this time, because as a result of the opening of the pressure relief valve 26 refrigerant flows from the delivery side of the compressor 10 through the pressure relief valve 26 into the condenser 14 side, a normal refrigerating cycle operation (the cooling mode state) is assumed while the refrigerant recovery is performed.

Then, when the continuation time of the recovery control mode reaches the above-mentioned predetermined time (for example 30 seconds), processing proceeds from step S180 to step S200 and sets the flag IG to 1 before proceeding to step S210 where the hot gas bypass heating mode is started. That is, the first electromagnetic valve 13 is closed, the second electromagnetic valve 21 is opened, the electromagnetic clutch 11 (and hence the compressor 10) is kept ON, and the air-conditioning blower 23 is started to execute the hot gas bypass heating mode. The cooling fan 14a may be left off.

On the other hand, when at step S130 the cooling switch is ON, processing proceeds to step S220 and it is determined whether a cooling operation condition is established at step S230. Here, a cooling operation condition being established means none of the following cooling stop conditions is applicable: the low-side pressure of the refrigerating cycle being below a predetermined value (for example 2.0 kg/cm2G); the outside air temperature being below a predetermined value (for example 0° C.); and the evaporator temperature being below a predetermined value (for example 3° C.).

In other words, at step S230, the electromagnetic clutch 11 is turned on, the compressor 10 is started, and the cooling fan 14a and the air-conditioning blower 23 are operated. Also, the first electromagnetic valve 13 is opened and the second electromagnetic valve 21 is closed. By this means, the above-mentioned cooling mode is set and cooling of the passenger compartment is carried out.

When at step S220 one of the above-mentioned cooling stop conditions applies, the determination of step S220 is NO, and processing moves to S140.

When at step S120 the heating (hot gas operation) switch is OFF, processing proceeds to step S240. When it is determined that the cooling switch is ON and furthermore a cooling operation condition is established, processing proceeds to step S230 and sets the cooling mode.

When on the other hand it is determined at step S240 either that the cooling switch is OFF or that the cooling operation condition is not established, processing proceeds to step S250 and closes both of the first and second electromagnetic valves 13, 21 and turns off the electromagnetic clutch 11 and thereby stops the compressor 10 and stops the refrigerating cycle. When the determinations at steps S140 and S150 are NO, since the hot gas bypass heating mode is not necessary, processing moves to step S250 and stops the refrigerating cycle.

In the present invention, resting refrigerant on the condenser 14 side can be recovered whether the compressor 10 is a fixed capacity type or a variable capacity type. In particular, if the compressor 10 is a type whose capacity is changed using the cycle high-low pressure difference, when the compressor 10 is operated during normal refrigerating cycle operation (cooling mode operation), at times of low outside air temperature such as during winter heating, because the cycle high-low pressure difference becomes consistently small due to decreased cooling load, the capacity of the compressor 10 cannot be made large. However, with the present invention, because during refrigerant recovery control the circuit on the delivery side of the compressor 10 is blocked by closure of the first and second electromagnetic valves 13, 21 as described above, the delivery pressure of the compressor 10 can be rapidly increased.

Consequently, even when the variable capacity compressor 10 is operated at a time of low outside air temperature such as during winter heating, because the cycle high-low pressure difference rises steeply and the capacity of the compressor 10 can be made large, refrigerant recovery can be quickly carried out.

Figure 3:
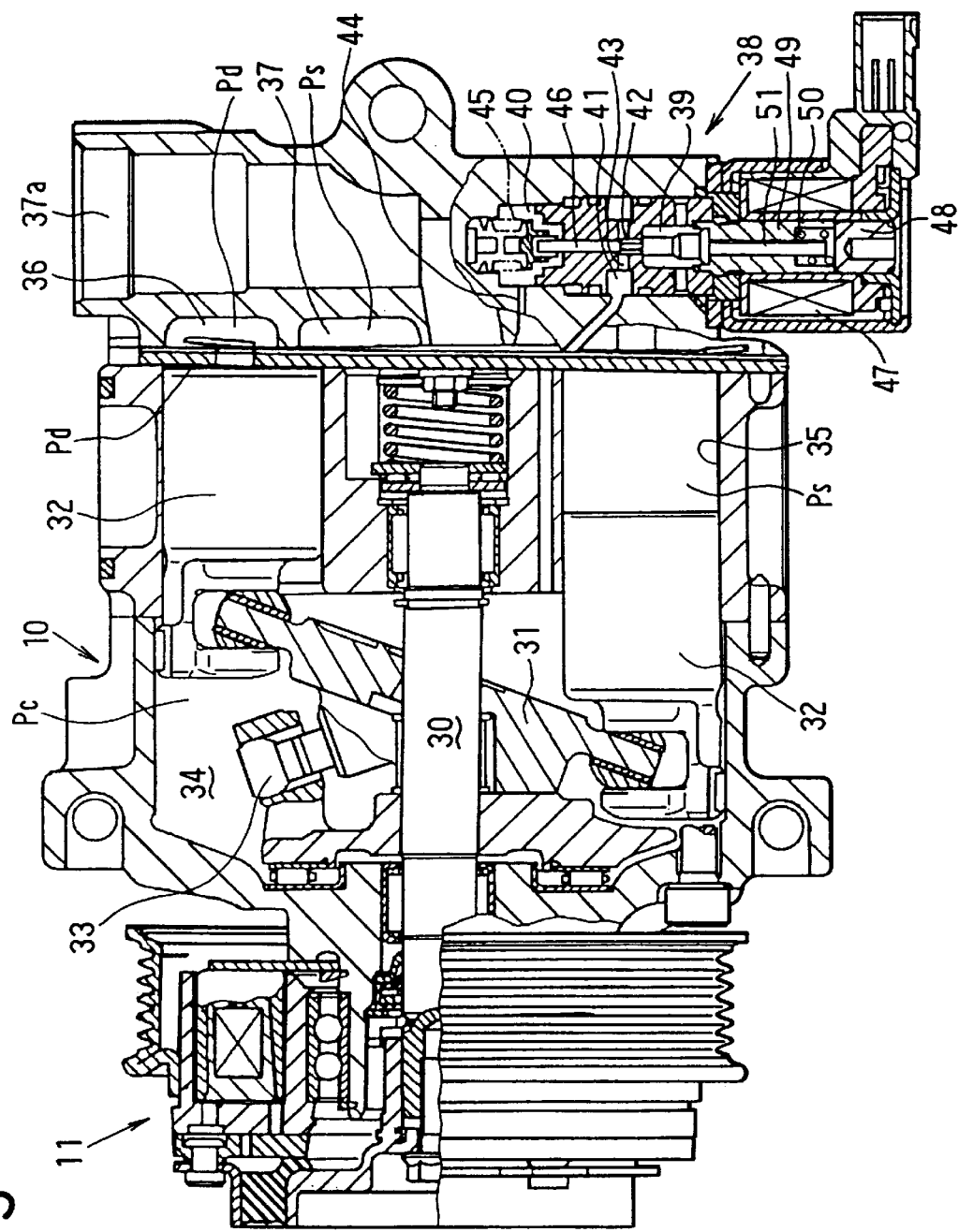
FIG. 3 is a sectional view of a variable capacity compressor used in the first embodiment.

FIG. 3 shows an example of a specific structure of a variable capacity compressor 10; this is known technology and therefore will be described here only briefly. The compressor 10 is a wobble type compressor. When power from the vehicle engine 12 is transmitted by way of the electromagnetic clutch 11 to a rotating shaft 30 of the compressor 10, the rotating shaft 30 rotates. A rotating swash plate 31 is integrally connected to the rotating shaft 30, and rotation of the swash plate causes pistons 32 to reciprocate in the axial direction.

Also, the angle of inclination of the swash plate 31 can be changed to change the stroke of the pistons 32 and thereby vary the delivery capacity of the compressor 10. To this end, the swash plate 31 is linked in an oscillating manner to the rotating shaft 30 and specifically is supported by a spherical supporting member 33. The angle of inclination of the swash plate 31 changes with the balance of the pressures acting on the front and rear ends of the pistons 32. These pressures include the pressure inside a crank chamber 34 acting on the rear faces of the pistons 32, namely a control pressure Pc, and the pressure inside cylinders 35 in which the pistons 32 reciprocate (a discharge pressure Pd and an intake pressure Ps). Thus, by adjusting the control pressure Pc inside the crank chamber 34 it is possible to vary the angle of inclination of the swash plate 31. By lowering the control pressure Pc, the angle of inclination of the swash plate 31 and thus the capacity of the compressor 10 are increased.

Gas refrigerant compressed in the cylinders 35 of the compressor 10 is discharged into a discharge chamber 36 and is delivered via a discharge port (not shown) to the upstream sides of the first and second electromagnetic valves 13, 21. Refrigerant is taken into the cylinders 35 of the compressor 10 through an intake chamber 37. This intake chamber 37 connects with the outlet side of the accumulator 19 of FIG. 1 via an intake opening 37a. The pressure (control pressure) Pc of the crank chamber 34 is changed by an electromagnetic pressure control device 38 using the refrigerant discharge pressure Pd of the discharge chamber 36 and the refrigerant intake pressure Ps of the intake chamber 37.

This electromagnetic pressure control device 38 has a discharge pressure chamber 39 connecting with the discharge chamber 36, an intake pressure chamber 40 connecting with the intake chamber 37, and a control pressure chamber 41 connecting with the crank chamber 34. The discharge pressure chamber 39 is connected to the control pressure chamber 41 by way of a variable throttle 43 having its aperture adjusted by a valve member 42. The intake pressure chamber 40 is connected to the control pressure chamber 41 by way of a fixed throttle 44. Here, the more the valve member 42 displaces in the direction in which it closes the variable throttle 43, the more the pressure of the control pressure chamber 41, i.e. the control pressure Pc, falls and the angle of inclination of the swash plate 31 increases.

A bellows member 45 made of a flexible material is disposed inside the intake pressure chamber 40. A predetermined internal pressure Pb is set inside this bellows member 45, and the bellows member 45 lengthens and shortens in response to changes of the refrigerant intake pressure Ps with respect to this internal pressure Pb. This lengthening and shortening of the bellows member 45 displaces the valve member 42 by way of a rod 46. An electromagnetic force of an electromagnetic mechanism also acts on the bellows member 45 and the valve member 42.

In this example, the electromagnetic mechanism is made up of an electromagnetic coil 47, a fixed magnetic pole member 48, a moving magnetic pole member (plunger) 49 attracted in the direction of the fixed magnetic pole member 48 (the direction in which the bellows member 45 lengthens) by the electromagnetic force of the electromagnetic coil 47, and a coil spring 50 with its spring force acting on the moving magnetic pole member 49. A rod 51 is connected to the middle of the moving magnetic pole member 49. The rod 51, the valve member 42 and the rod 46 are integrally connected.

A control current from the ECU 27 is applied to the electromagnetic coil 47 of the electromagnetic mechanism, and the electromagnetic force applied to the moving magnetic pole member 49 varies with the control current and causes the set pressure of the intake pressure to vary. That is, the set pressure of the intake pressure rises as the control current is increased.

When due to an increase in the cooling load the intake pressure Ps rises, the control pressure Pc inside the control pressure chamber 41 is lowered. Because this fall in the control pressure Pc causes the pressure of the crank chamber 34 to fall and the back pressure on the pistons 32 to fall, the swash plate 31 tilts, and the angle of inclination θ of the swash plate 31 increases. As a result, the stroke of the piston 32 and the capacity of the compressor 10 increase. As a result, the flow of refrigerant circulating around the cycle is raised, the refrigerating capacity is increased, and consequently the intake pressure Ps gradually falls.

Conversely, when the refrigerant intake pressure Ps falls, the control pressure Pc of the control pressure chamber 41 is raised. Because this rise of the control pressure Pc causes the pressure of the crank chamber 34 to rise, the swash plate 31 straightens and the angle of inclination θ of the swash plate 31 decreases. Consequently, the stroke of the pistons 32 and the capacity of the compressor 10 decrease. As a result, the flow of refrigerant circulating around the cycle is reduced and the cooling capacity decreases. Consequently, the refrigerant intake pressure Ps gradually rises.

In view of the above features of the present invention, it is possible to control the temperature (the exit air temperature) of the evaporator 18 by controlling the refrigerant intake pressure Ps by capacity control of the compressor 10. Also, it is possible to adjust the evaporator exit air temperature by adjusting the set pressure of the refrigerant intake pressure Ps by adjusting the control current of the electromagnetic coil 47.

(Second Preferred Embodiment)

Figure 4:
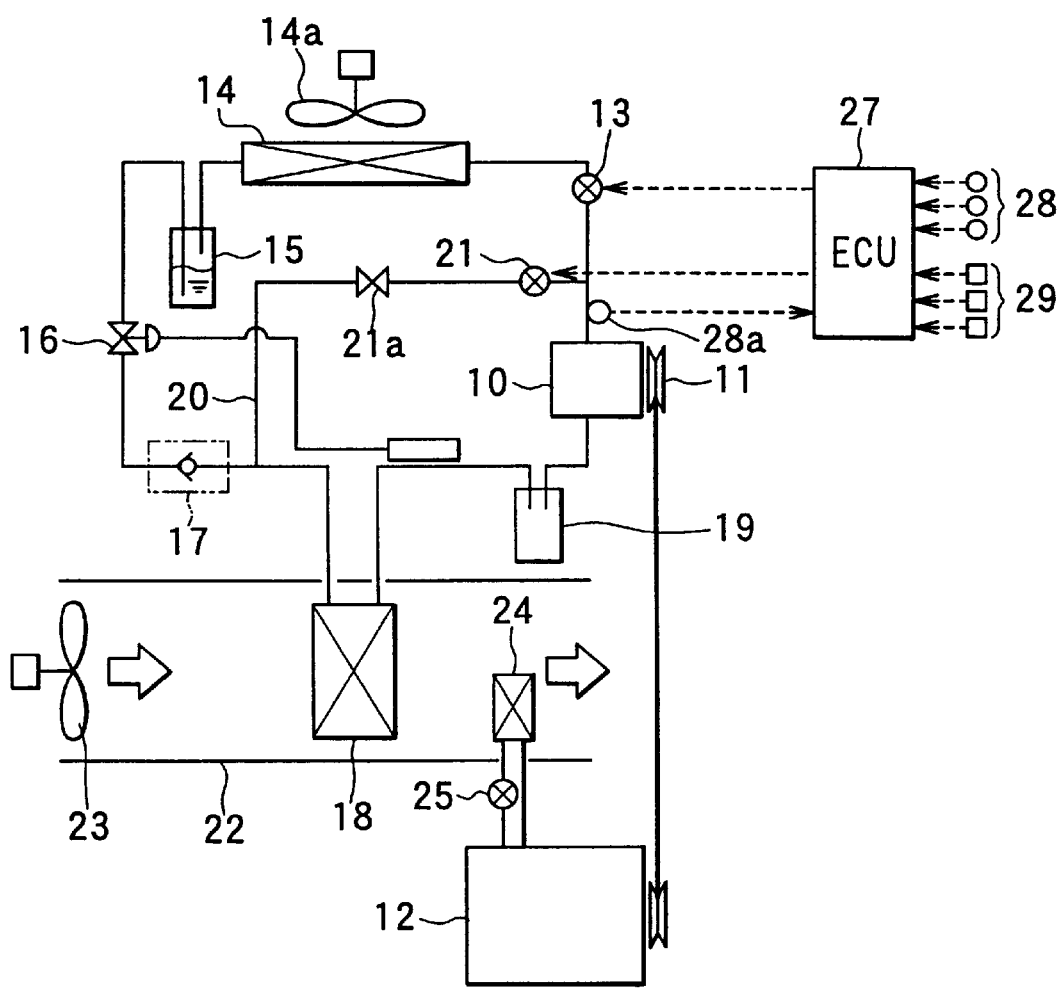
FIG. 4 is a schematic view of a refrigerating cycle of a second preferred embodiment of the present invention.

FIG. 4 shows a second preferred embodiment differing from the first preferred embodiment in that the pressure relief valve 26 of the first preferred embodiment is dispensed with, and a pressure sensor 28a for detecting the pressure of refrigerant gas is disposed on the delivery side of the compressor 10. In this second preferred embodiment, a delivery side pressure PD0 immediately before start-up of the compressor 10 is detected and stored by the ECU 27.

Figure 2:
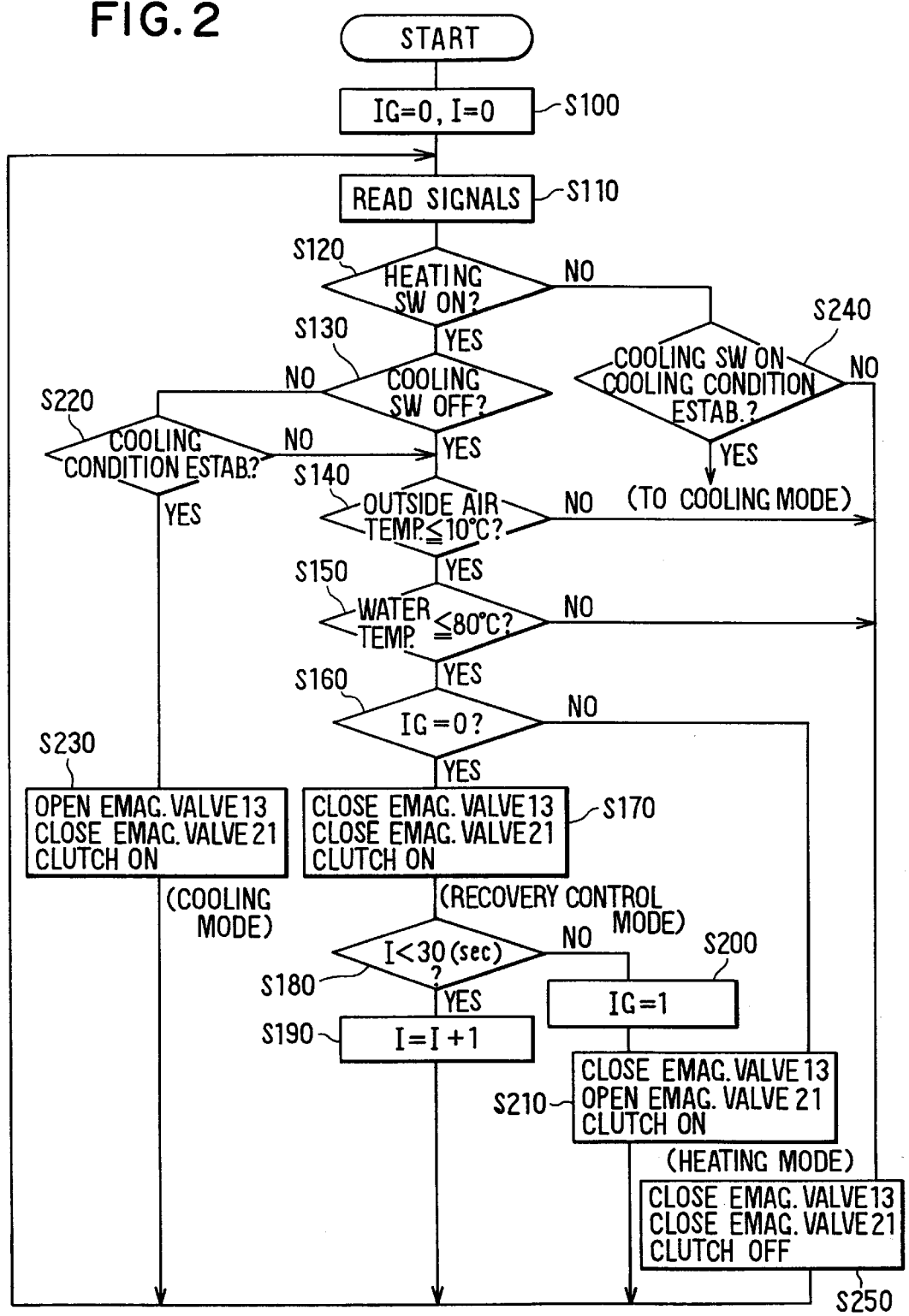
FIG. 2 is a flow diagram showing resting refrigerant recovery control of the first embodiment.
Figure 5:
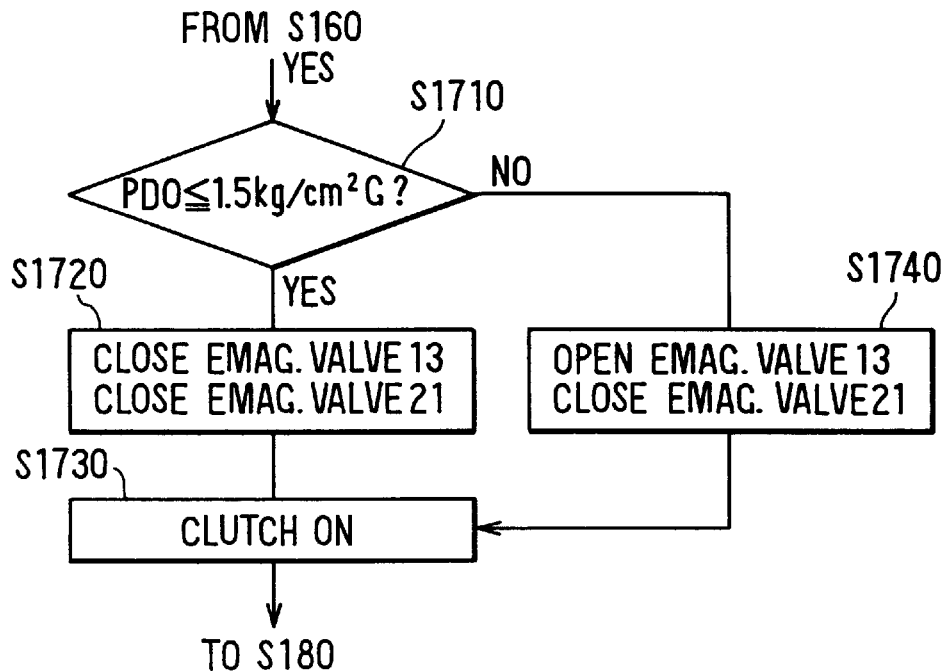
FIG. 5 is a flow diagram showing refrigerant recovery control pertaining to the second embodiment.

FIG. 5 is a flow diagram showing the operation of this second preferred embodiment, and corresponds to the refrigerant recovery mode step S170 part of FIG. 2 in the first preferred embodiment. In FIG. 5, it is determined at step S1710 whether the delivery side pressure PD0 before start-up of the compressor 10 detected by the pressure sensor 28a is below a set value (for example 1.5 kg/cm2G). If this determination is YES, processing proceeds to step S1720 and closes both the first and second electromagnetic valves 13, 21.

Then, at step S1730, the electromagnetic clutch 11 is turned on and the compressor 10 is started. At this time, the condenser cooling fan 14a and the air-conditioning blower 23 are still stopped. By the inlet sides of both the condenser 14 and the hot gas bypass conduit 20 being closed and the compressor 10 being operated at steps S1720 and S1730, a first refrigerant recovery mode for recovering refrigerant in the condenser 14 side to the evaporator 18 side is set.

When on the other hand the delivery side pressure PD0 before start-up of the compressor 10 is higher than the set value, the determination at step S1710 is NO, and processing proceeds to step S1740 and opens the first electromagnetic valve for cooling 13 and closes only the second electromagnetic valve for heating 21. Then, at step S1730, the electromagnetic clutch 11 is turned on and the compressor 10 is started.

By the inlet side of the condenser 14 being opened and the inlet side of the hot gas bypass conduit 20 being closed and the compressor 10 being operated at steps S1740 and S1730, a second refrigerant recovery mode for recovering resting refrigerant in the condenser 14 side to the evaporator 18 side is set.

With this second preferred embodiment, because when the delivery side pressure PD0 before start-up of the compressor 10 is higher than a predetermined value, a second refrigerant recovery mode, wherein the first electromagnetic valve for cooling 13 is opened and only the second electromagnetic valve for heating 21 is closed, is set at step S1740. This is unlike the first refrigerant recovery mode, wherein both of the electromagnetic valves 13, 21 are closed. Therefore, in the second recovery mode, the rate of increase in the compressor delivery side pressure during refrigerant recovery is lower. Because of this, the compressor delivery side pressure can be prevented from rising abnormally during refrigerant recovery, and the pressure relief valve 26 is not needed.

When the delivery side pressure PD0 before start-up of the compressor 10 is below the set value, the first refrigerant recovery mode, wherein both of the electromagnetic valves 13, 21 are closed, is set at step S1720, and the cycle high-low pressure difference can be made to increase quickly while refrigerant recovery is carried out.

(Third Preferred Embodiment)

Figure 6:
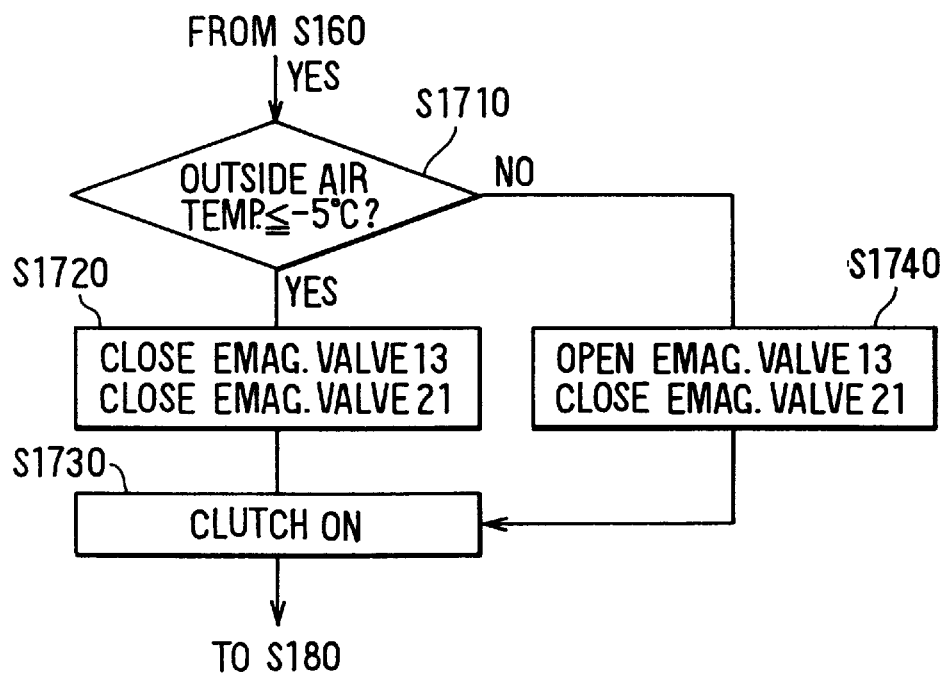
FIG. 6 is a flow diagram showing refrigerant recovery control pertaining to a third preferred embodiment of the present invention.

FIG. 6 shows a third preferred embodiment of the present invention. In the second preferred embodiment, it is determined at step S1710 whether the delivery side pressure PD0 before start-up of the compressor 10 is below a set value. However, if a certain amount of time has elapsed after the compressor stops, the delivery side pressure PD0 before start-up of the compressor of the refrigerating cycle is at a saturation pressure determined by the compressor ambient temperature, i.e. the outside air temperature.

In view of this, in the third preferred embodiment, instead of determining whether the delivery side pressure PD0 before start-up of the compressor 10 is high or low, it is determined whether the outside air temperature detected by an outside air temperature sensor among the sensors 28 is high or low. That is, when at step S1710 of FIG. 6 the outside air temperature is below a set value (for example −5° C.), at step S1720, the first refrigerant recovery mode, wherein the first and second electromagnetic valves 13, 21 are both closed, is set.

When on the other hand the outside air temperature is above a set value (for example −5° C.), at step S1740 the second refrigerant recovery mode, wherein the first electromagnetic valve for cooling 13 is opened and only the second electromagnetic valve for heating 21 is closed, is set. As a result, the same effects as those of the second preferred embodiment can be obtained with the third preferred embodiment.

(Fourth Preferred Embodiment)

Figure 7:
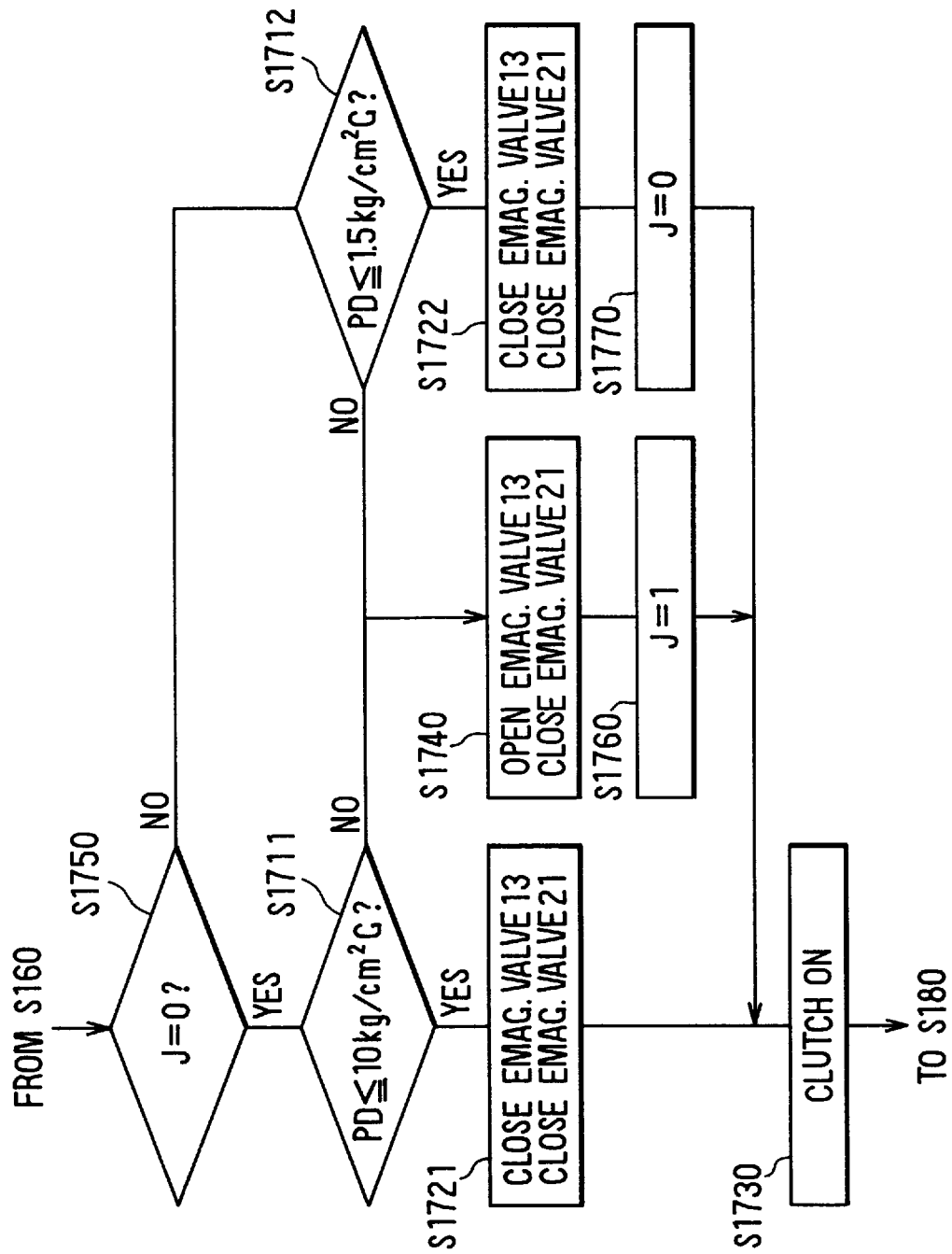
FIG. 7 is a flow diagram showing refrigerant recovery control pertaining to a fourth preferred embodiment of the present invention.

FIG. 7 shows a fourth preferred embodiment. Whereas in the foregoing second and third preferred embodiments switching of the first and second refrigerant recovery modes is carried out based on the delivery side pressure PD0 before start-up of the compressor 10 or the outside air temperature, which is a physical quantity related to the delivery side pressure PD0, in this fourth preferred embodiment switching of the first and second refrigerant recovery modes is carried out based on the delivery side pressure PD during compressor operation.

That is, in the fourth preferred embodiment, as shown in FIG. 7, at step S1750 it is determined whether a flag J=0. This flag J is initialized to 0 at step S100 of FIG. 2, and therefore in the first determination after the start of the control routine the determination is YES. Processing then proceeds to step S1711 and determines whether the delivery side pressure PD during operation of the compressor 10 is below a somewhat high first set value (for example 10 kg/cm2G).

If this determination is YES, processing proceeds to step S1721 and closes both the first electromagnetic valve for cooling 13 and the second electromagnetic valve for heating 21. At step S1730, the electromagnetic clutch 11 is turned on and thereby starts the compressor 10, and thereafter continues the operation of the compressor 10. Thus, the first refrigerant recovery mode is set and refrigerant is recovered from the condenser 14 side to the evaporator 18 side via steps S1721 and S1730.

When on the other hand the delivery side pressure PD during operation of the compressor 10 is above the first set value, the determination at step S1711 is NO, and processing proceeds to step S1740 and opens the first electromagnetic valve 13 and closes only the second electromagnetic valve 21. The second refrigerant recovery mode is thus, set and refrigerant is recovered from the condenser 14 side to the evaporator 18 side.

Then at step S1760 the flag J is updated to 1. As a result, in subsequent processing the determination of step S1750 is NO, and at step S1712 it is determined whether the delivery side pressure PD during operation of the compressor 10 is below a somewhat low second set value (for example 1.5 kg/cm2G). When the delivery side pressure PD during operation of the compressor 10 is higher than the second set value, processing proceeds to step S1740 and continues the second refrigerant recovery mode.

When on the other hand the delivery side pressure PD during operation of the compressor 10 falls below the second set value while the second refrigerant recovery mode is being executed, processing proceeds from step S1712 to step S1722 and closes both the first and second electromagnetic valves 13, 21 and thereby sets the first refrigerant recovery mode and recovers refrigerant from the condenser 14 side to the evaporator 18 side. At step S1770 the flag J is updated to 0. Consequently, during subsequent processing, it is once again determined at step S1711 whether the delivery side pressure PD is large or small.

In the fourth preferred embodiment, because when the delivery side pressure PD during operation of the compressor 10 is higher than a somewhat high first set value (for example 10 kg/cm2G) the system mode is switched from the first refrigerant recovery mode to the second refrigerant recovery mode, an abnormal rise in compressor delivery side pressure can be prevented during refrigerant recovery.

Furthermore, because an ample difference (hysteresis) is provided between the first set value and the second set value at which switching between the first and second refrigerant recovery modes is carried out, hunting during refrigerant recovery is prevented.

(Fifth Preferred Embodiment)

Figure 8:
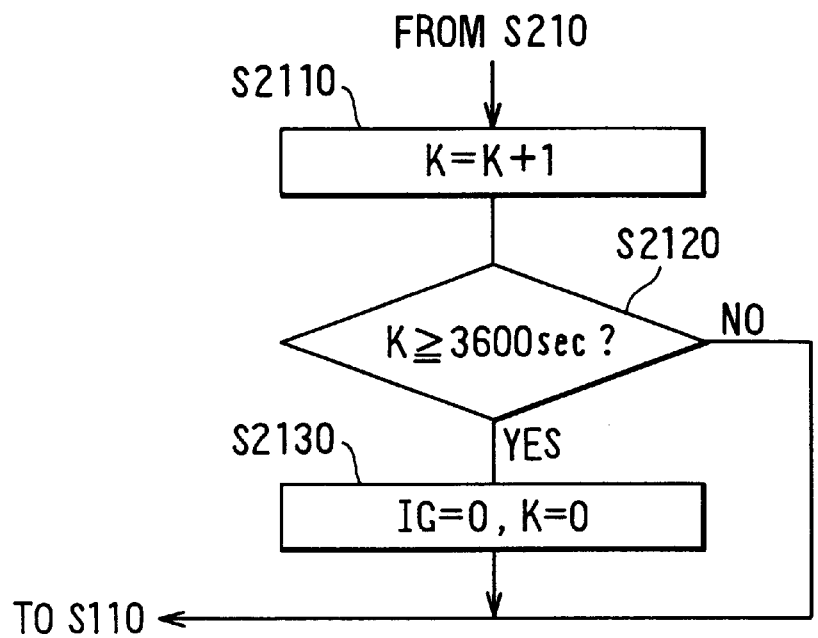
FIG. 8 is a flow diagram showing refrigerant recovery control pertaining to a fifth preferred embodiment of the present invention.

FIG. 8 shows a fifth preferred embodiment of the invention, wherein a refrigerant recovery mode is executed also when the hot gas bypass heating mode has continued for a long time (for example over 1 hour). That is, when the hot gas bypass heating mode continues for a long time, a phenomenon of refrigerant collecting in the condenser 14 side due to refrigerant leakage in the first electromagnetic valve 13 and the check valve 17 occurs. Consequently, a shortage of refrigerant in the hot gas cycle may arise during heating mode operation.

To avoid this, in this fifth preferred embodiment, as shown in FIG. 8, following step S210 (FIG. 2) in which the heating mode is executed, at step S2110 the heating mode operation time K is counted, and at step S2120 it is determined whether this operating time K has reached a set time (for example 3600 secs=1 hour). When the operating time K reaches the set time, processing proceeds to step S2130 and updates the flag IG to 0 and the operating time K to 0.

When the flag IG is updated to 0, processing proceeds from step S160 to step S170 and executes the refrigerant recovery mode. Thus, with the fifth preferred embodiment, the refrigerant recovery mode is executed automatically and a refrigerant shortage in the hot gas cycle is prevented not only at the start of the heating mode but also after the heating mode has continued for a long time.

(Sixth Preferred Embodiment)

Figure 9:
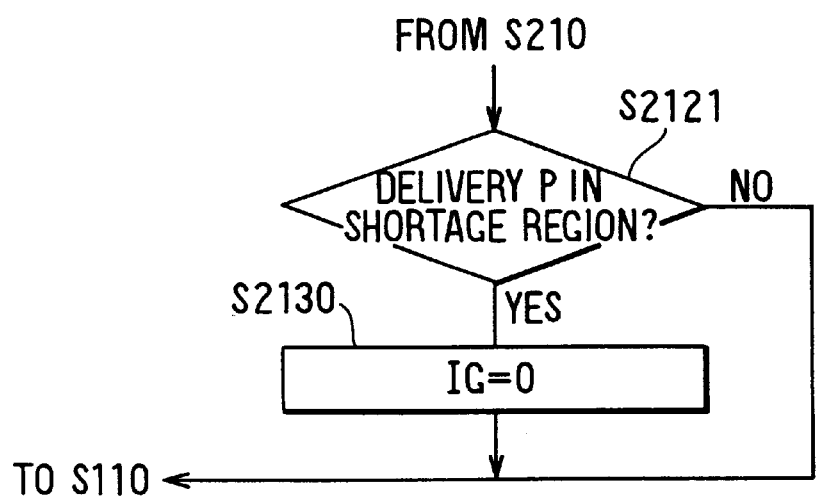
FIG. 9 is a flow diagram showing refrigerant recovery control pertaining to a sixth preferred embodiment of the present invention.
Figure 10:
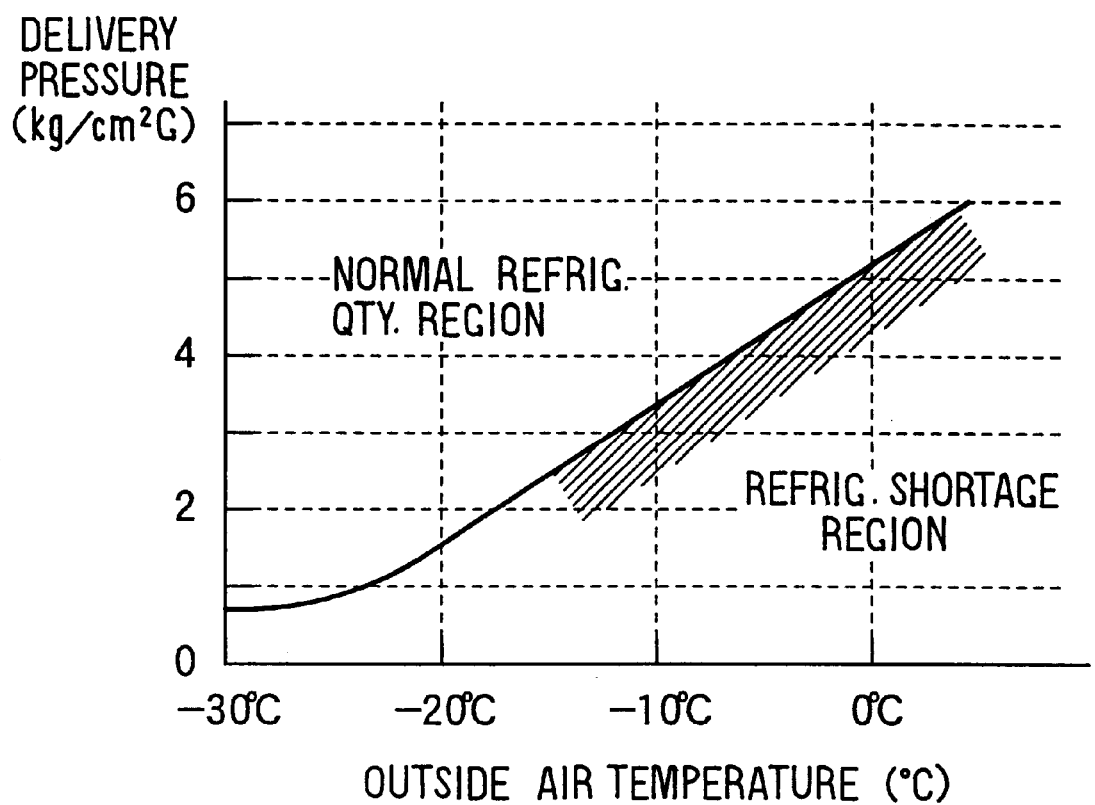
FIG. 10 is a diagram of a map used in refrigerant shortage determination in the sixth preferred embodiment.

FIG. 9 and FIG. 10 show a sixth preferred embodiment of the invention. Whereas in the fifth preferred embodiment the refrigerant recovery mode is automatically executed based on the heating mode operating time K, in the sixth preferred embodiment the refrigerant recovery mode is automatically executed on direct detection of a refrigerant shortage in the hot gas cycle.

That is, as shown in FIG. 9, after step S210, at step S2121 it is determined whether the delivery side pressure is in a refrigerant shortage region. This determination is carried out based on a map shown in FIG. 10. FIG. 10 is obtained by mapping the outside air temperature against the range of compressor delivery side pressure during heating mode operation over which a refrigerant shortage will occur in the hot gas bypass heating mode.

When the compressor delivery side pressure during heating mode operation is in the refrigerant shortage pressure range of FIG. 10, it is determined that there is a refrigerant shortage, and at step S2130 the flag IG is updated to 0 and the refrigerant recovery mode is executed.

(Seventh Preferred Embodiment)

Figure 11:
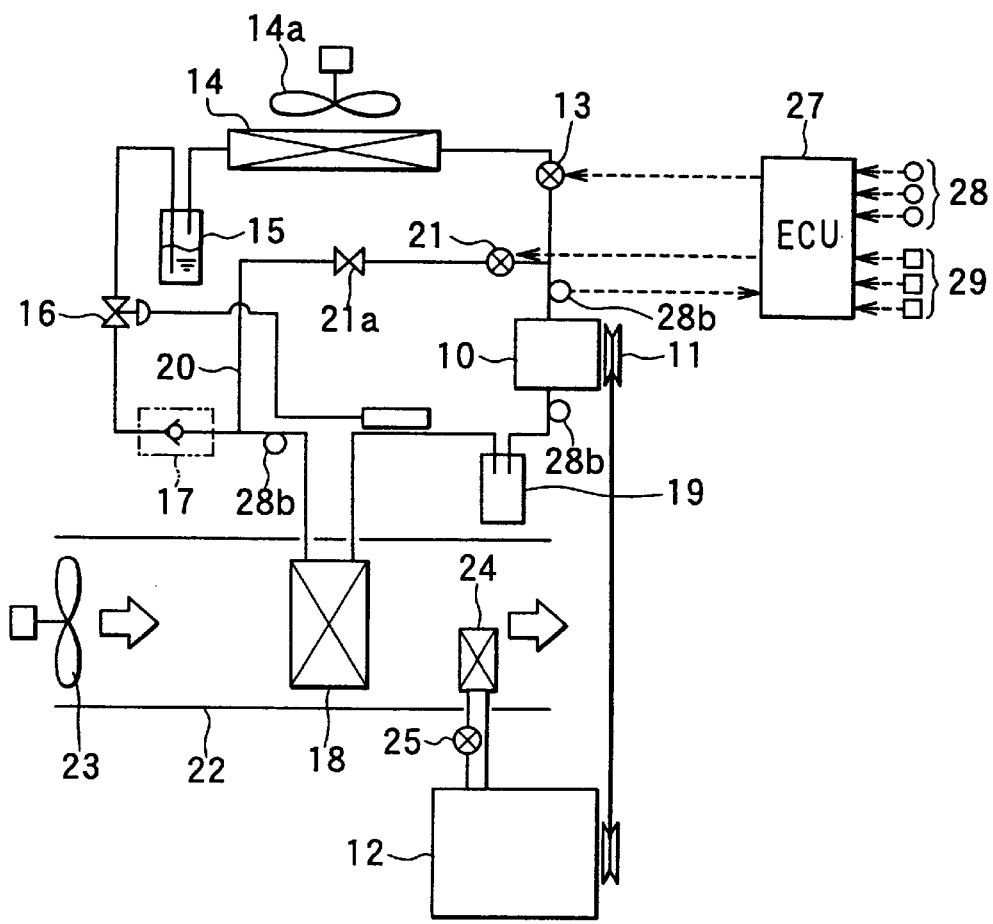
FIG. 11 is a schematic view of a refrigerating cycle of a seventh preferred embodiment of the present invention.
Figure 12:
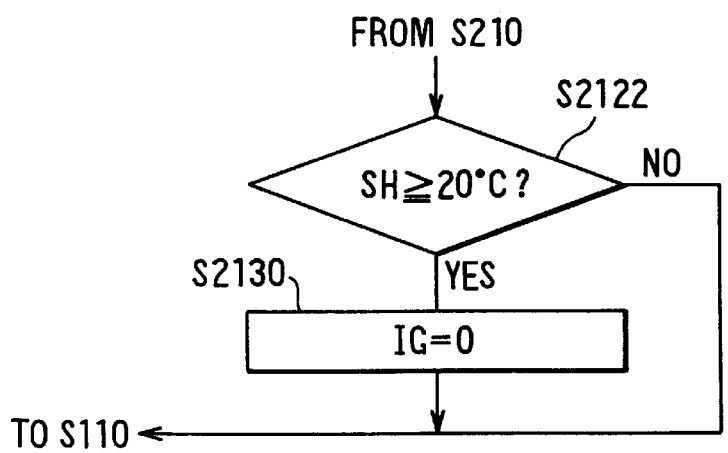
FIG. 12 is a flow diagram showing refrigerant recovery control pertaining to the seventh embodiment.

FIG. 11 and FIG. 12 show a seventh preferred embodiment, wherein a refrigerant shortage in the hot gas cycle is detected by means different from those used in the foregoing sixth preferred embodiment.

As shown in FIG. 11, a superheating degree detector 28b made up of a refrigerant pressure and temperature sensors is provided in one location, either on the delivery side of the compressor 10, at the inlet of the evaporator 18, or on the intake side of the compressor 10. At step S2122 shown in FIG. 12 it is determined whether the degree of superheating detected by this detector 28b is above a set value (for example 20° C.). When the degree of superheating is above the set value, at step S2130 the flag IG is updated to 0 and the refrigerant recovery mode is executed.

(Other Preferred Embodiments)

[1] In the first preferred embodiment described above, a mechanical valve configuration combining a spring and a valve biased by the spring was used as the pressure relief valve 26. However, alternatively a pressure sensor for detecting the pressure of refrigerant gas may be provided on the compressor delivery side in parallel with the first electromagnetic valve 13. An electromagnetic valve would open only when based on a detection signal from this pressure sensor indicating the compressor delivery side refrigerant gas pressure has reached a predetermined pressure. That is, the relief valve in the first preferred embodiment may alternatively be an electromagnetic valve.

Also, if the first electromagnetic valve 13 is a normally-open valve when no current is applied, because the first electromagnetic valve 13 will open in a cut wire breakdown or the like and thus a fail-safe function is obtained, the relief valve in the first preferred embodiment or the above-mentioned electromagnetic valve is not necessary. Instead, the first electromagnetic valve 13 may be controlled to open instead when the compressor delivery side refrigerant gas pressure rises to or above a predetermined pressure.

[2] The first and second electromagnetic valves 13, 21 in the foregoing preferred embodiments may be replaced with a single valve device integrating switching functions of a plurality of conduits.

[3] Although in the first preferred embodiment a the manually operated heating switch a dedicated switch is provided in the air-conditioning control panel, alternatively the manually operated switch can be dispensed with and replaced with other switching means. For example, a manual warm-up switch for idling up the vehicle engine 12 is provided, the hot gas bypass heating mode may be started in conjunction with the operation of this manual switch for warming up the engine.

[4] Also, in a vehicle wherein warming up of the vehicle engine 12 is carried out automatically when a warm-up condition is detected by an engine ECU (not shown), the hot gas bypass heating mode may be automatically started based on a warm-up signal from the engine ECU.

Thus the heating switch ON determination of step S120 can be carried out based on any of various different signals.

[5] Although in the preferred embodiments described above the invention was applied to a refrigerating cycle of a vehicle air-conditioning system, the invention can of course be applied to refrigerating cycles in various applications.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A refrigerating cycle apparatus comprising:
   a compressor for compressing and delivering a refrigerant;
   a condenser for condensing the refrigerant compressed by the compressor;
   a first pressure-reducing device for reducing in pressure the refrigerant condensed by the condenser;
   an evaporator for evaporating the refrigerant reduced in pressure by the first pressure-reducing device;
   a hot gas bypass conduit directly connecting a delivery side of the compressor to an inlet side of the evaporator;

a second pressure-reducing device provided in the hot gas bypass conduit for reducing in pressure gas refrigerant compressed by the compressor;

valves for switching a connection between the delivery side of the compressor and an inlet side of the condenser, and a connection between the delivery side of the compressor and an inlet side of the hot gas bypass conduit;

wherein a normal cooling mode is carried out with the inlet side of the condenser opened and the inlet side of the hot gas bypass conduit closed by the valves, and a hot gas bypass heating mode is carried out with the inlet side of the condenser closed and the inlet side of the hot gas bypass conduit opened by the valves; and a controller for recovering refrigerant from the condenser side to the evaporator side upon starting of the heating mode, the controller causing the refrigerant to be recovered by operating the compressor with at least the inlet side of the hot gas bypass conduit closed by the valves.

2. The apparatus of claim 1, wherein the controller causes the condenser-side refrigerant to be recovered to the evaporator side upon starting of the heating mode by causing the compressor to be operated with the inlet sides of both the condenser and the hot gas bypass conduit closed by the valves.

3. The apparatus of claim 1, wherein the controller includes a timer for causing the recovery of the refrigerant to be carried out for a predetermined time upon the starting of the hot gas bypass heating mode.

4. The apparatus of claim 1, further comprising a relief valve disposed in a refrigerant passage for bypassing one of the valves and connecting the delivery side of the compressor to the inlet side of the condenser, the relief valve opening when a delivery side pressure of the compressor exceeds a predetermined value.

5. The apparatus of claim 1, wherein the recovery of the refrigerant is carried out after the operation of the hot gas bypass heating mode for a predetermined time.

6. The apparatus of claim 1, further comprising determining means for determining if a refrigerant shortage occurs during the operation of the heating mode, wherein the refrigerant is recovered when the determining means determines a refrigerant shortage condition exists.

7. The apparatus of claim 6, wherein the determining means determines the refrigerant shortage condition exists when the delivery side pressure of the compressor during the hot gas bypass heating mode operation falls within a refrigerant shortage region based on an outside air temperature.

8. The apparatus of claim 6, wherein the determining means determines the refrigerant shortage condition exists based on a rise in a degree of superheating of the refrigerant in the hot gas bypass heating mode.

9. A refrigerating cycle apparatus comprising:

a compressor for compressing and delivering a refrigerant;

a condenser for condensing delivered gas refrigerant from the compressor;

a first pressure-reducing device for reducing in pressure refrigerant condensed by the condenser;

an evaporator for evaporating refrigerant reduced in pressure by the first pressure-reducing device;

a hot gas bypass conduit directly connecting the delivery side of the compressor to the inlet side of the evaporator;

a second pressure-reducing device provided in the hot gas bypass conduit for reducing in pressure delivered gas refrigerant from the compressor;

valves for switching a connection between a delivery side of the compressor and an inlet side of the condenser and a connection between the delivery side of the compressor and an inlet side of the hot gas bypass conduit;

wherein operation of a normal cooling mode is carried out with the inlet side of the condenser opened and the inlet side of the hot gas bypass conduit closed by the valves, and operation of a hot gas bypass heating mode is carried out with the inlet side of the condenser closed and the inlet side of the hot gas bypass conduit opened by the valves;

wherein a first refrigerant recovery mode for recovering refrigerant from a condenser side to an evaporator side is set by the compressor being operated with the inlet sides of both the condenser and the hot gas bypass conduit closed by the valves; and a second refrigerant recovery mode for recovering refrigerant from the condenser side to the evaporator side is set by the compressor being operated with the inlet side of the condenser opened and the inlet side of the hot gas bypass conduit closed by the valves.

10. The apparatus of claim 9, wherein the first and second refrigerant recovery modes are switched based on a physical quantity related to a delivery side pressure of the compressor.

11. The apparatus of claim 10, wherein the physical quantity related to the delivery side pressure of the compressor is one of a pressure before starting of the compressor, a pressure during operation of the compressor, and an outside air temperature.

12. The apparatus of claim 10, wherein the first refrigerant recovery mode is set when the value of the physical quantity is below a set value and the second refrigerant recovery mode is set when the value of the physical quantity is above the set value.

13. In a refrigerating circuit including a compressor, a condenser, an evaporator, a hot gas bypass conduit connecting a delivery side of the compressor to an inlet side of the evaporator, and valves for switchably connecting the delivery side of the compressor to one of an inlet side of the condenser and an inlet side of the hot gas bypass conduit, a method for recovering refrigerant from a condenser side of the compressor to the delivery side thereof, comprising:

determining that a hot gas heating bypass mode condition exists;

closing at least an inlet side of the hot gas bypass conduit; and operating the compressor to create a pressure on the delivery side that is higher than that on the condenser side by a predetermined value to thereby suck refrigerant from the condenser side to the delivery side.

14. The method of claim 13, wherein the step of closing at least an inlet side of the hot gas bypass conduit comprises closing both the inlet sides of the hot gas bypass conduit and the condenser.

15. The method of claim 13, wherein the closing of at least an inlet side of the hot gas bypass conduit further comprises:

detecting a pressure of the refrigerant on the condenser side to determine whether the pressure is at or above a predetermined level;

subsequently closing the inlet side of the hot gas bypass conduit if the pressure is above the predetermined level; and closing both the inlet sides of the hot gas bypass conduit and the condenser if the pressure is below the predetermined level.

16. The method of claim 14, wherein the closing of at least the inlet side of the hot gas bypass conduit further comprises relieving a predetermined amount of the pressure on the delivery side after the pressure reaches a predetermined maximum level.

17. The method of claim 13, wherein the closing of at least an inlet side of the hot gas bypass conduit is determined based on ambient air temperature.

18. The method of claim 13, wherein the closing of at least an inlet side of the hot gas bypass conduit is performed during the operating of the compressor (10).

19. The method of claim 13, wherein the closing of at least an inlet side of the hot gas bypass conduit and the operating of the compressor thereafter occur after a predetermined lengthy period of operation in the hot gas bypass heating mode.

20. The method of claim 13, further comprising directly detecting a refrigerant shortage on the delivery side to effect the closing of at least an inlet side of the hot gas bypass conduit and the operating of the compressor thereafter.

21. The method of claim 13, further comprising directly detecting a degree of refrigerant superheating on the delivery side to effect the closing of at least an inlet side of the hot gas bypass conduit and the operating of the compressor thereafter.

* * * * *